US012563622B2

(12) United States Patent
Shanmugaraju et al.

(10) Patent No.: US 12,563,622 B2
(45) Date of Patent: Feb. 24, 2026

(54) SYSTEMS AND METHODS FOR DUAL-CONNECTIVITY SPLIT-BEARER PACKET MANAGEMENT

(71) Applicant: Outdoor Wireless Networks LLC, Richardson, TX (US)

(72) Inventors: Naveen Shanmugaraju, Bangalore (IN); Shiva Prakash, Bengaluru (IN); Irfaan Ahamed Salahuddeen, Acton, MA (US); Shailendra Yadav, Gurgaon (IN)

(73) Assignee: Outdoor Wireless Networks LLC, Richardson, TX (US)

( * ) Notice: Subject to any disclaimer, the term of this patent is extended or adjusted under 35 U.S.C. 154(b) by 508 days.

(21) Appl. No.: 18/053,532

(22) Filed: Nov. 8, 2022

(65) Prior Publication Data

US 2023/0156842 A1 May 18, 2023

(30) Foreign Application Priority Data

Nov. 16, 2021 (IN) .............................. 202141052499

(51) Int. Cl.
*H04W 76/16* (2018.01)
*H04W 28/12* (2009.01)
*H04W 92/20* (2009.01)

(52) U.S. Cl.
CPC ........... *H04W 76/16* (2018.02); *H04W 28/12* (2013.01); *H04W 92/20* (2013.01)

(58) Field of Classification Search
CPC ...... H04W 76/16; H04W 28/12; H04W 92/20
See application file for complete search history.

(56) References Cited

U.S. PATENT DOCUMENTS

| | | | |
|---|---|---|---|
| 2017/0135023 A1 | 5/2017 | Jung et al. | |
| 2018/0206173 A1* | 7/2018 | Virtej | .................... H04W 40/02 |
| 2019/0098682 A1* | 3/2019 | Park | ......................... H04L 1/08 |

(Continued)

OTHER PUBLICATIONS

International Searching Authority, "International Search Report and Written Opinion", from PCT Application No. PCT/US2022/079454, from Foreign Counterpart to U.S. Appl. No. 18/053,532, filed Mar. 16, 2023, pp. 1 through 11, Published in: WO.

(Continued)

*Primary Examiner* — Ajay Cattungal
(74) *Attorney, Agent, or Firm* — Fogg & Powers LLC

(57) ABSTRACT

Systems and methods for dual-connectivity split-bearer packet management are presented. In one embodiment, a dual-connectivity, split-bearer base station, comprises: at least one centralized unit (CU) comprising a CU-CP) and at least one CU-UP; at least one DU coupled to the at least one CU-UP, wherein the at least one DU is coupled to one or more RUs configured as a first cell group to establish a first radio link for communicating with UE within a wireless coverage area; an eNodeB coupled to the at least one CU-UP, wherein the eNodeB comprises one or more RPs configured as a second cell group to establish a second radio link for communicating with UE within the wireless coverage area; and a traffic split controller configured to selectively direct PDCP packets to either the DU or the eNodeB as a function of packet delay times associated with the DU and the eNodeB.

24 Claims, 5 Drawing Sheets

(56) References Cited

U.S. PATENT DOCUMENTS

| | | | | |
|---|---|---|---|---|
| 2019/0150224 | A1 | 5/2019 | Han et al. | |
| 2019/0174353 | A1 | 6/2019 | Yilmaz et al. | |
| 2020/0045583 | A1* | 2/2020 | Kim | H04W 28/0815 |
| 2020/0314862 | A1 | 10/2020 | Wu | |
| 2020/0374955 | A1 | 11/2020 | Dudda et al. | |
| 2021/0014737 | A1 | 1/2021 | Yang et al. | |
| 2021/0297928 | A1 | 9/2021 | Chowta et al. | |
| 2023/0055590 | A1* | 2/2023 | Sivaraj | H04W 28/02 |
| 2023/0403606 | A1* | 12/2023 | Lunardi | H04W 24/02 |
| 2024/0147471 | A1* | 5/2024 | Islam | H04W 72/51 |
| 2024/0187071 | A1* | 6/2024 | Li | H04W 24/10 |
| 2024/0196178 | A1* | 6/2024 | Ying | H04W 8/18 |
| 2024/0259932 | A1* | 8/2024 | Ianev | H04W 48/16 |
| 2024/0259982 | A1* | 8/2024 | Tiwari | H04W 28/02 |
| 2024/0365322 | A1* | 10/2024 | Islam | H04W 72/20 |
| 2024/0365409 | A1* | 10/2024 | Tamura | H04W 72/1268 |
| 2024/0365432 | A1* | 10/2024 | Tamura | H04W 76/19 |
| 2024/0373481 | A1* | 11/2024 | Ianev | H04W 48/06 |
| 2025/0133424 | A1* | 4/2025 | Tamura | H04W 24/04 |

OTHER PUBLICATIONS

ETSI, "ETSI TS 137 340, Universal Mobile Telecommunications System (UMTS); LTE; 5G; NR; Multi-connectivity; Overall description; Stage-2 (3GPP TS 37.340 version 15.5.0 Release 15)", ETSI Technical Specification, May 2019, pp. Cover through 69.

ETSI, ETSI TS 138 323, 5G; NR; Packet Data convergence Protocol (PDCP) specification (3GPP TS 38.323 version 15.2.0 Release 15), ETSI Technical Specification, Sep. 2018, pp. Cover through 27.

ETSI, "ETSI TS 138 425, 5G; NG-RAN; NR user plane protocol (3GPP TS 38.425 Version 15.2.0 Release 15)", ETSI Technical Specification, Jul. 2018, pp. Cover through 23.

European Patent Office, "Extended European Search Report", dated Sep. 11, 2025, from EP Application No. 22896637.0, from Foreign Counterpart to U.S. Appl. No. 18/053,532, pp. 1 through 11, Published: EP.

* cited by examiner

310    Calculating a first packet delivery delay based on DDDS feedback received from an LTE RLC entity 320    Calculating a second packet delivery delay based on DDDS feedback received from an NR RLC entity 330    Selectively enqueueing packets to either the LTE RLC Queue server or the NR RLC Queue server based on whether the first or second delay is the lesser delay

SYSTEMS AND METHODS FOR DUAL-CONNECTIVITY SPLIT-BEARER PACKET MANAGEMENT

CROSS-REFERENCE TO RELATED APPLICATIONS

The present application claims benefit of Indian Patent Application Serial No. 202141052499, filed Nov. 16, 2021; the entire contents of the aforementioned patent application are incorporated herein by reference as if set forth in its entirety.

BACKGROUND

A centralized radio access network (C-RAN) can be used to implement base station functionality for providing wireless service to various items of user equipment (UE). In particular, cloud-based virtualization of Fifth Generation (5G) base stations (also referred to as "g NodeBs" or "gNBs") is widely promoted by standards organizations, wireless network operators, and wireless equipment vendors. Such an approach can help provide better high-availability and scalability solutions as well as addressing other issues in the network. In general, a 5G gNodeB can be partitioned into different entities, each of which can be implemented in different ways. For example, each entity can be implemented as a physical network function (PNF) or a virtual network function (VNF) and in different locations within an operator's network (for example, in the operator's "edge cloud" or "central cloud"). A distributed 5G gNodeB can be partitioned into one or more central units (CUs), one or more distributed units (DUs), and one or more radio units (RUs). The CU and DUs together are referred to as a baseband controller (BC). Each CU can be further partitioned into a central unit control-plane (CU-CP) and one or more central unit user-plane (CU-UPs) dealing with the gNodeB Packet Data Convergence Protocol (PDCP) and above layers of functions of the respective planes, and each DU configured to implement the upper part of physical layer through radio link control (RLC) layer of both control-plane and user-plane of gNodeB. In this example, each RU is configured to implement the radio frequency (RF) interface and lower physical layer control-plane and user-plane functions of the gNodeB. Each RU is typically implemented as a physical network function (PNF) and is deployed in a physical location where radio coverage is to be provided. Each DU is typically implemented as a virtual network function (VNF) and, as the name implies, is typically distributed and deployed in a distributed manner in the operator's edge cloud. Each CU-CP and CU-UP are typically implemented as virtual network functions (VNFs) and, as the name implies, are typically centralized and deployed in the operator's central cloud.

With the 5G New Radio (5G-NR) wireless interface standard, 5G user equipment (UE) can support dual-connectivity (DC) split-bearer configurations that simultaneously utilize both 5G and LTE radio bearers. The Packet Data Convergence Protocol (PDCP) packets of a bearer are split between the Radio Link Control (RLCs) protocol layers for primary (5G) and secondary (LTE) cell groups. User plane communications with the wireless network operator's core network flow through the 5G gNodeB via an S1-U interface between the gNodeB and the core network. A portion of the user plane communications are split at the CU-UP and sent to an LTE controller to form LTE radio bearers. An X2-U interface is established between the LTE controller (eNodeB) and the CU-UP of the gNodeB so that user plane communications for the LTE radio bearers can be forwarded between the two using the X2-U interface. The user plane communications for 5G NR radio bearers are processed by the CU-UP of the gNodeB and forwarded between the CU-UP and each of the DUs using an 5G F1-U interface. The 5G UE thus benefits from the ability to establish parallel communication links via the 5G NR primary cell and the LTE secondary cell for accessing the wireless services of the core network.

A problem develops, however, from the fact that the delay on these two DC paths can be different. As a result, PDCP packets can arrive out-of-order at the receiving PDCP entity. For example, in the downlink direction the PDU stream from the transmitting PDCP is split and transmitted by the gNB or eNB and receiving of the two streams of PDCP PDUs is at the UE. Out-of-order packets received by the UE are queued in the UE PDCP re-ordering buffer and a PDCP re-ordering timer is started, to allow time for missing packets to be received, and for packet ordering (e.g., by packet sequence number) for in-order delivery to higher layers within the UE. Currently, when the re-ordering timer expires, the available packets in the re-ordering buffer are delivered to the higher layers, even if out-of-order, and the next expected PDCP packet sequence number is updated. From that point, packets arriving later at the UE with a lower PDCP Sequence Number than those already delivered to the higher layers are discarded. Discarded and out-of-order packet delivery can significantly impact throughput for applications, particularly those based on TCP. A high re-ordering delay also affects the throughput of such applications. Hence, it is important to avoid (1) out-of-order delivery and (2) minimize the packet re-ordering delay.

SUMMARY

The Embodiments of the present disclosure provide methods and systems for dual-connectivity split-bearer packet management and will be understood by reading and studying the following specification.

In one embodiment, a dual-connectivity, split-bearer base station, comprises: at least one centralized unit (CU) comprising a centralized unit control-plane (CU-CP) and at least one centralized unit user-plane (CU-UP); at least one distributed unit (DU) coupled to the at least one CU-UP, wherein the at least one DU is coupled to one or more radio units (RUs) configured as a first cell group to establish a first radio link for communicating with user equipment (UE) within a wireless coverage area; an eNodeB coupled to the at least one CU-UP, wherein the eNodeB comprises one or more radio points (RPs) configured as a second cell group to establish a second radio link for communicating with user equipment (UE) within the wireless coverage area; and a traffic split controller configured to selectively direct Packet Data Convergence Protocol (PDCP) packets to either the DU or the eNodeB as a function of packet delay times associated with the DU and the eNodeB.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure address the issues of out-of-order delivery and packet re-ordering delay caused by dual connectivity architectures by estimating delays to determine how packets should be enqueued, with the aim to minimize inter-packet delay for consecutive PDCP sequence numbers. As a result, these PDCP packets will reach the UE with a minimum delay included between each packet, hence minimizing the wait time in which PDCP packets remain queued in the PDCP re-ordering buffer. To minimize inter-packet delay estimates are computed for each of the DC links (e.g., the LTE and NR links) an algorithm selects the DC link having the lower delay in transmitting packets to the UE. As the CU-UP enqueues packets on the DC link with lower delay, that link's delay for subsequent packets will keep increasing, and eventually the delay will exceed the other DC links' delay. When that point is reached, the CU-UP switches to the other link for transmitting packets to the UE. Although the examples discussed herein primarily illustrate implementations involving New Radio Dual Connectivity (EN-DC) on Evolved UMTS (Universal Mobile Telecommunications Service) Terrestrial Radio Access Networks (E-UTRANs), the approach is applicable for other Dual Connectivity solutions, such as but not limited to, NE-DC or NR-DC.

Figure 1:
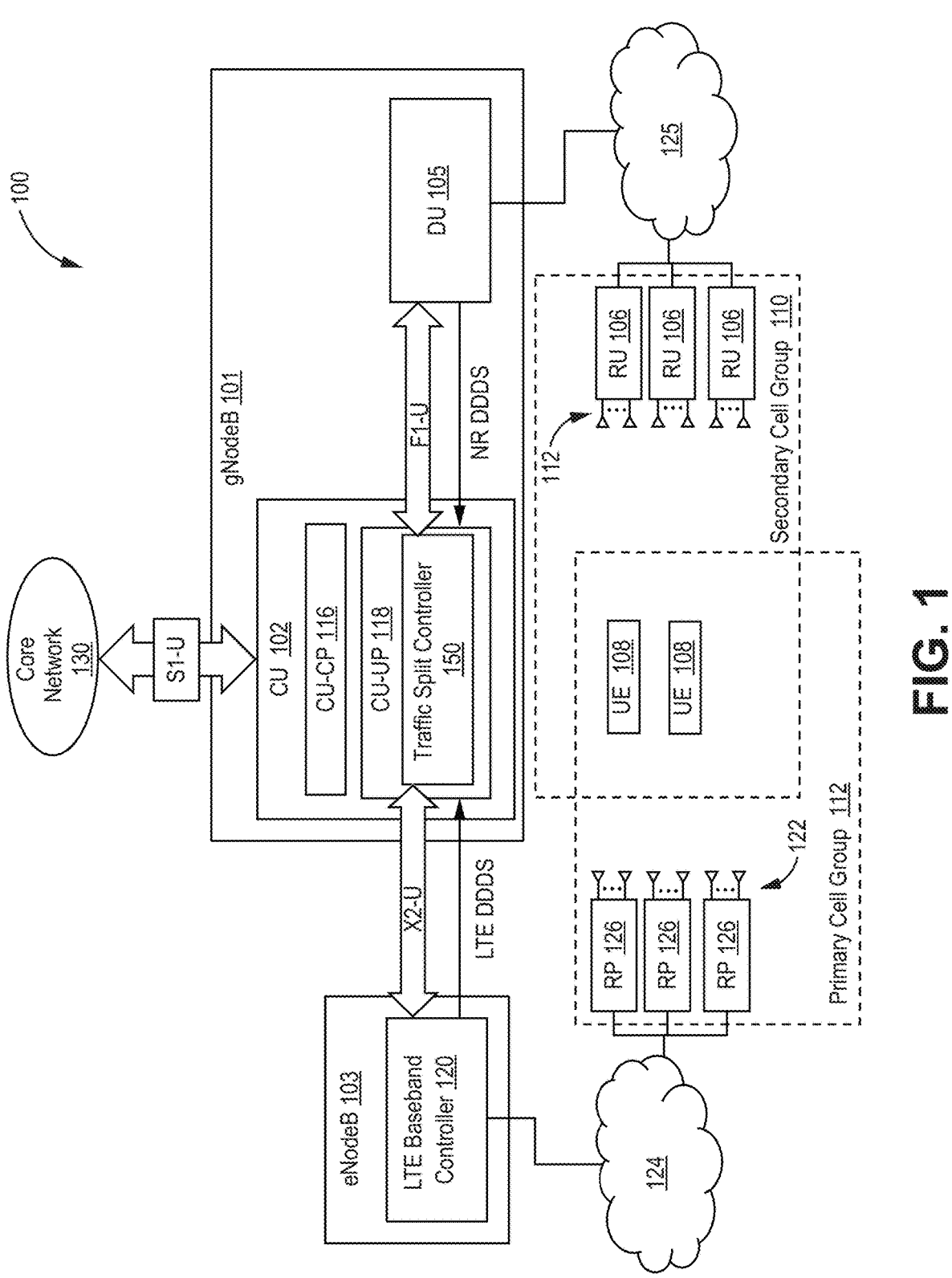
FIGS. 1 and 2 are block diagrams illustrating one example of a dual-connectivity, split-bearer, base station embodiment.
Figure 2:
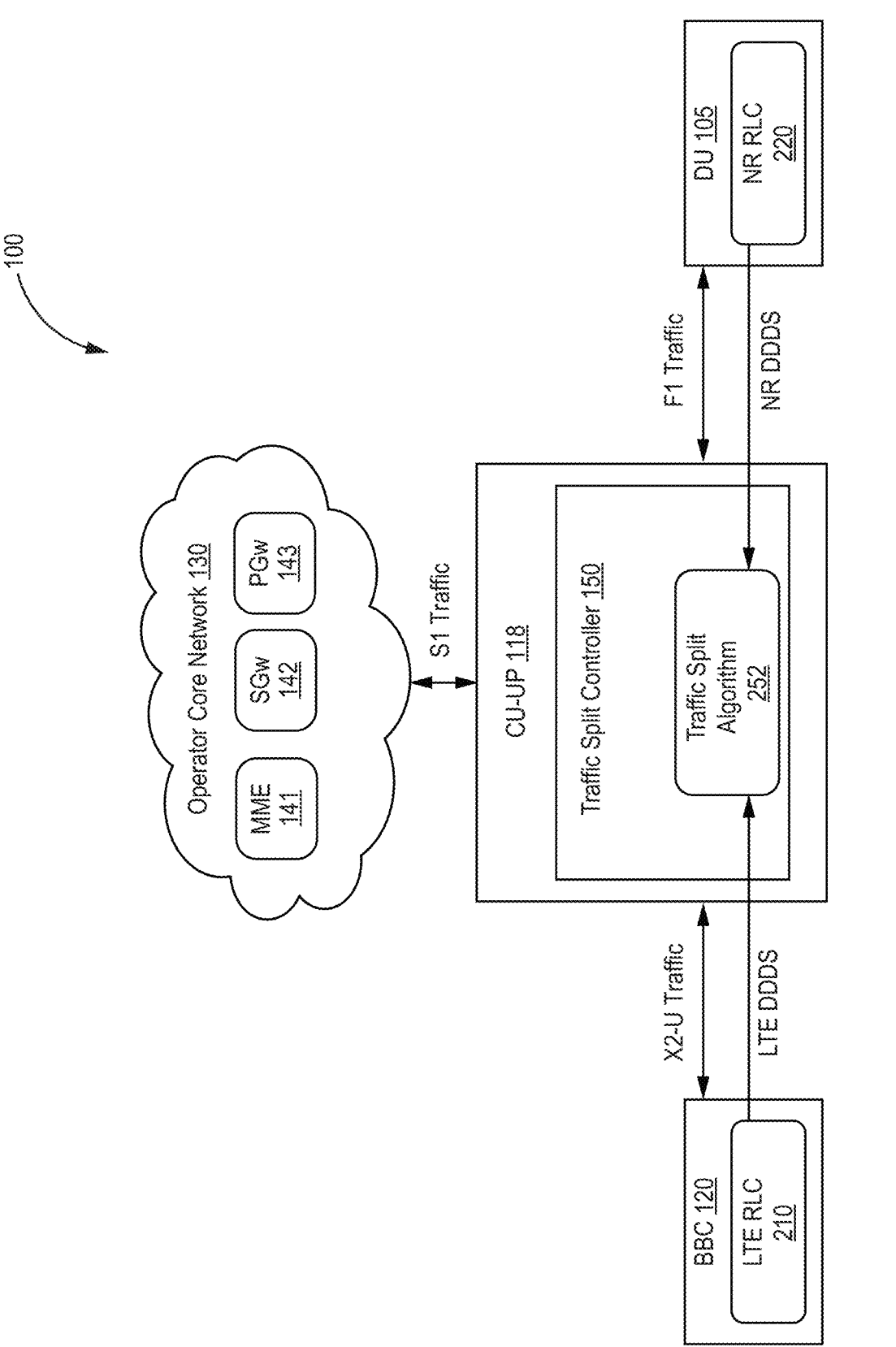

FIG. 1 is a block diagram illustrating one example of a dual-connectivity, split-bearer, base station 100. In the particular example shown in FIG. 1, the dual-connectivity base station 100 comprises a 5G gNodeB 101 partitioned into one or more central units (CUs) 102 (also referred to as centralized units), which includes a centralized unit control-plane (CU-CP) 116 and at least one centralized unit user-plane (CU-UP) 118. The gNodeB 101 is further partitioned into one or more distributed units (DU) 105 each coupled to one or more radio units (RUs) 106. In this example the 5G gNodeB 101 is configured so that each CU 102 is configured to serve one or more DU 105 and each DU 105 is configured to serve one or more RUs 106. In the particular configuration shown in FIG. 1, a single CU 102 serves a single DU 105, and the DU 105 shown in FIG. 1 serves three RUs 106. However, the particular configuration shown in FIG. 1 is only one example. In other embodiments, other numbers of CUs 102, DUs 105, and RUs 106 can be used. Also, the number of DU 105 served by each CU 102 can vary from CU 102 to CU 102. Likewise, the number of RUs 106 served by each DU 105 can vary from DU 105 to DU 105. The DU 105 and RUs 106 are coupled to each other by a fronthaul network 125, which may comprise a switched Ethernet network, a private network, and/or the Internet, for example. As shown in FIG. 2, the DU 105 includes an NR RLC 220 that comprises an RLC Queue server. In general, the gNodeB 101 is configured to provide wireless service via 5G NR radio bearers to various numbers of user equipment (UEs) 108 using one or more cells 110, which in this embodiment are referred to as a secondary cell group 110 that form a first radio link for communicating with UEs 108 within a wireless coverage area. Each RU 106 includes or is coupled to a respective set of one or more antennas 122 via which downlink RF signals are radiated to UEs 108 and via which uplink RF signals transmitted by UEs 108 are received.

Base station 100 further includes at least one eNodeB 103 that includes an LTE baseband controller 120, or BBC, also referred to as a baseband unit, or BBU. In some embodiments, the eNodeB 103 may be referred to as a Master eNodeB (MeNB). As shown in FIG. 2, the LTE baseband controller 120 includes an LTE RLC 210 that comprises an RLC Queue server. The baseband controller 120 is coupled to one or more radio points (RPs) 126, which are essentially equivalent in function to the radio units 106. Each radio point 126 is remotely located from the BBC 120. In general, the eNodeB 103 is configured to provide wireless service via 4G LTE radio bearers to the UEs 108 using one or more cells 112, which in this embodiment are referred to as a primary cell group 112 that form a second radio link for communicating with UEs 108 within the wireless coverage area. Each radio point 126 includes or is coupled to a respective set of one or more antennas 122 via which downlink RF signals are radiated to UEs 108 and via which uplink RF signals transmitted by UEs 108 are received. In some embodiments, the BBC 120 and RPs 126 are coupled to each other by a fronthaul network 124, which may comprise a switched Ethernet network, a private network, and/or the Internet, for example.

It is to be understood that 5G NR embodiments can be used in both standalone and non-standalone modes (or other modes developed in the future) and the following description is not intended to be limited to any particular mode. Also, unless explicitly indicated to the contrary, references to "layers" or a "layer" (for example, Layer 1, Layer 2, Layer 3, the Physical Layer, the MAC Layer, etc.) set forth herein refer to layers of the wireless interface (for example, 5G NR or 4G LTE) used for wireless communication between a base station and user equipment).

In some embodiments, the gNodeB 101 is implemented as a virtualized gNodeB using a scalable cloud environment in which resources used to instantiate each type of entity can be scaled horizontally (that is, by increasing or decreasing the number of physical computers or other physical devices) and vertically (that is, by increasing or decreasing the "power" (for example, by increasing the amount of processing and/or memory resources) of a given physical computer or other physical device). Such a scalable cloud environment can be implemented in various ways. For example, the scalable cloud environment can be implemented using hardware virtualization, operating system virtualization, and application virtualization (also referred to as containerization) as well as various combinations of two or more of the preceding. The scalable cloud environment can be implemented in a distributed manner within a distributed scalable cloud environment comprising at least one central cloud and at least one edge cloud. In such an embodiment, each of the DU 105, CU-CP 116, and CU-UP 118 are implemented as virtual network functions by a software virtualized entity executed in the scalable cloud environment on a cloud worker node under the control of the cloud native software executing on that cloud worker node. A cloud worker node that implements at least a part of a CU 102 can also be referred as a "CU cloud worker node", and a cloud worker node that implements at least a part of a DU 105 referred to as a "DU cloud worker node".

User plane communications between the dual connectivity base station 100 and the wireless network operator's core network 130 flow through the 5G gNodeB v101 via an S1-U interface connected between the CU 102 and the core network 130. In some embodiments, the wireless network operator's core network 130 may comprise an Evolved Packet Core (EPC) network and/or include one or more of a Mobile Management Entity (MME) 141, a Serving Gateway (SGW) 142, and Packet Data Network Gateway (PGw) 143. A portion of the user plane communications are split at the CU-UP 118 and sent to the baseband controller 120 to form LTE radio bearers. An X2-U interface is established between the baseband controller 120 and the CU-UP 118 of the gNodeB 101 so that user plane communications for the LTE radio bearers can be forwarded between the two entities using the X2-U interface. The user plane communications for 5G NR radio bearers are processed directly by the CU-UP 118 of the gNodeB 101 and forwarded between the CU-UP 118 and each of the DU 105 using an 5G F1-U interface. With the eNodeB 103 and gNodeB 101 operating in parallel to establishes dual-connectivity with the UEs 108, the UEs 108 benefits from parallel communication links via the LTE primary cell group 112 and the 5G NR secondary cell group 110 for accessing the wireless services of the core network 130.

As illustrated in FIG. 2, the CU-UP 118 comprises a traffic split controller 150 that includes a traffic split algorithm 252 which makes the determination as to how PDCP packets are split between LTE radio bearers for transmitting to the UE 108 via the primary cell group 112, and 5G NR radio bearers for transmitting to the UE 108 via the secondary cell group 110. The operation of the traffic split controller 150 and traffic split algorithm 252 can be discussed more particularly with respect to the Method 300 of FIG. 3 and Method 400 of FIG. 4.

The traffic-split algorithm 252 utilizes Downlink Data Delivery Status (DDDS) feedback from the LTE RLC 210 and the NR RLC 220 entities, to estimate the delay between the time the next packet is enqueued on the link, to the time the packet is received at the UE. The DDDS feedback from the LTE RLC 210 and the NR RLC 220 to the CU-UP 118 derived from acknowledgements received from the UE 108 of successful packet receptions, and provide an indication of successful PDCP packet deliveries which provides information about the highest PDCP PDU sequence number successfully delivered in sequence to the UE 108 via each path. For example, DDDS feedback returned to the traffic split controller 150 from the BBC 120 or DU 105 can include either the highest successfully delivered NR PDCP Sequence Number (in the case of an RLC acknowledgement mode (UM) bearer) or the highest transmitted NR PDCP Sequence Number (in the case of an RLC un-acknowledgement mode (UM) RLC). Then the DDDS feedback is utilized to estimate the delay for each of the DC paths. This process is illustrated by the method of FIG. 3.

Figure 3:
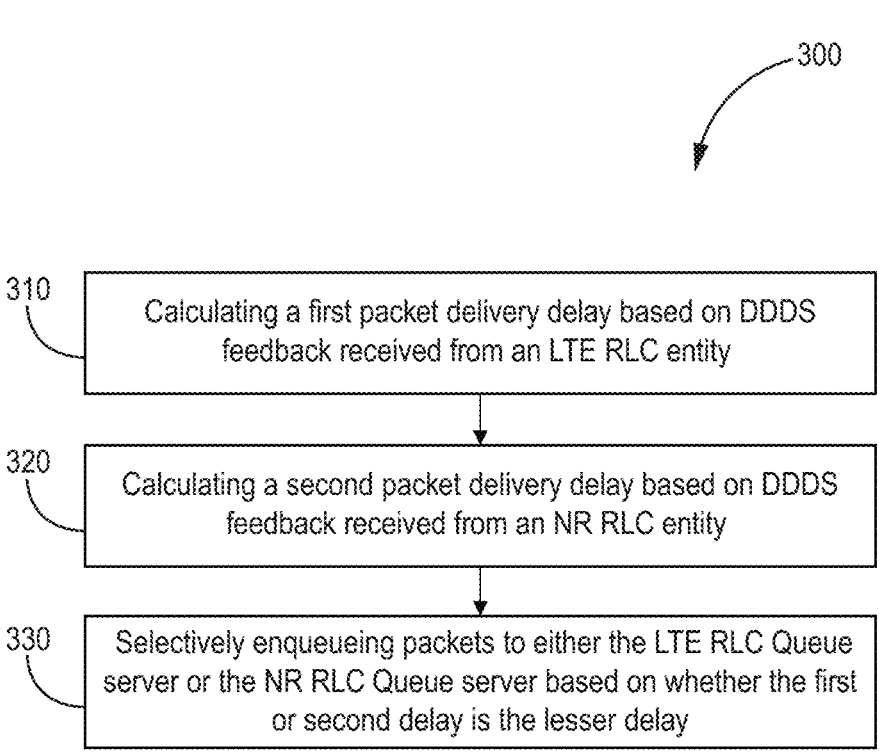
FIG. 3 is a flow chart illustrating a method for dual-connectivity traffic split management.

FIG. 3 is a flow chart diagram implementing an example method 300 for DC traffic split management that may be executed by the CU 102 to implement the traffic-split algorithm 252 coprocessor memory transaction regulation. It should be understood that the features and elements described herein with respect to the method of FIG. 3 may be used in conjunction with, in combination with, or substituted for elements of any of the other embodiments discussed herein and vice versa. Further, it should be understood that the functions, structures, and other description of elements for embodiments described in FIG. 3 may apply to like or similarly named or described elements across any of the figures and/or embodiments describe herein and vice versa.

The method 300 begins at 310 with calculating a first packet delivery delay based on DDDS feedback received from an LTE RLC entity, and 320 with calculating a second packet delivery delay based on DDDS feedback received from an NR RLC entity. For example in one embodiment the method 300 at 310 may calculate for a time, t, the value $Delay_{LTE}(t)$ using a function equivalent to:

$$Delay_{LTE}(t) = \frac{\#\,Bytes\ sent\ over\ LTE\ with\ SN > last\ transmitted\ SN_{LTE}(t)}{avg\ service\ rate\ of\ LTE\ (Bytes/time)\ (t)}$$

where the last transmitted $SN_{LTE}$ (t) is the highest successfully delivered NR PDCP Sequence Number (for an AM bearer) or the highest transmitted NR PDCP Sequence Number (for a UM bearer), obtained from DDDS feedback from the LTE RLC 210, and avg service rate of LTE is the average service rates of the LTE links which can be estimated at LTE RLC 210 and fed-back to the PDCP or can be calculated at the PDCP from the DDDS feedbacks from the LTE RLC 210.

The method 300 at 320 may calculate for a time, t, the value $Delay_{NR}(t)$ using a function equivalent to:

$$Delay_{NR}(t) = \frac{\#\,Bytes\ sent\ over\ NR\ with\ SN > last\ transmitted\ SN_{NR}(t)}{avg\ service\ rate\ of\ NR\ (Bytes/time)\ (t)}$$

where the last transmitted $SN_{NR}$ (t) is the highest successfully delivered NR PDCP Sequence Number (for an AM bearer) or the highest transmitted NR PDCP Sequence Number (for a UM bearer), obtained from DDDS feedback from the NR RLC 220, and avg service rate of NR is the average service rates of the NR links which can be estimated at NR RLC 220 and fed-back to the PDCP or can be calculated at the PDCP from the DDDS feedbacks from the NR RLC 220. For this method, it can be assumed that the RLC Queue servers at LTE RLC 210 and NR RLC 220 are never idle, and hence any X2/F1 interface latencies are "absorbed" in the RLC queue delays.

The method 300 then proceeds to 330 with selectively enqueueing packets to either the LTE RLC 210 Queue server or the NR RLC 220 Queue server based on whether the first or second delay is the lesser delay. That is, the RLC queue server having the lesser delay is selected for enqueueing packets. If $Delay_{LTE}(t) < Delay_{NR}(t)$, the traffic-split algorithm 252 indicates to the traffic split controller 150 of the CU-CP 118 to select the X2-U interface to send the packed to the eNodeB 103 to enqueue the packet with the LTE RLC

210 for transmission to the UE 108. Else, if $\text{Delay}_{LTE}(t)$ $>\text{Delay}_{NR}(t)$, the traffic-split algorithm 252 indicates to the traffic split controller 150 of the CU-CP 118 to select the F1-U interface to send the packed to the DU 105 to enqueue the packet with the NR RLC 220 for transmission to the UE 108.

Assuming that the RLC Queue servers are never idle, then the delay that a packet 'N' will see can be computed from:

$$\text{Delay}\,(N) = \text{latency}_{X2/F1} +$$

$$\frac{(\#\text{untransmitted packets} < N) - \left(\text{avg service rate} \times \text{latency}_{X2/F1}\right)}{\text{avg service rate}} =$$

$$\frac{(\#\text{untransmitted packets} < N)}{\text{avg service rate}}$$

One skilled in the art would understand that the RLC queues may be operated to never empty in order to avoid under-utilizing the LTE and/or NR links.

Figure 4:
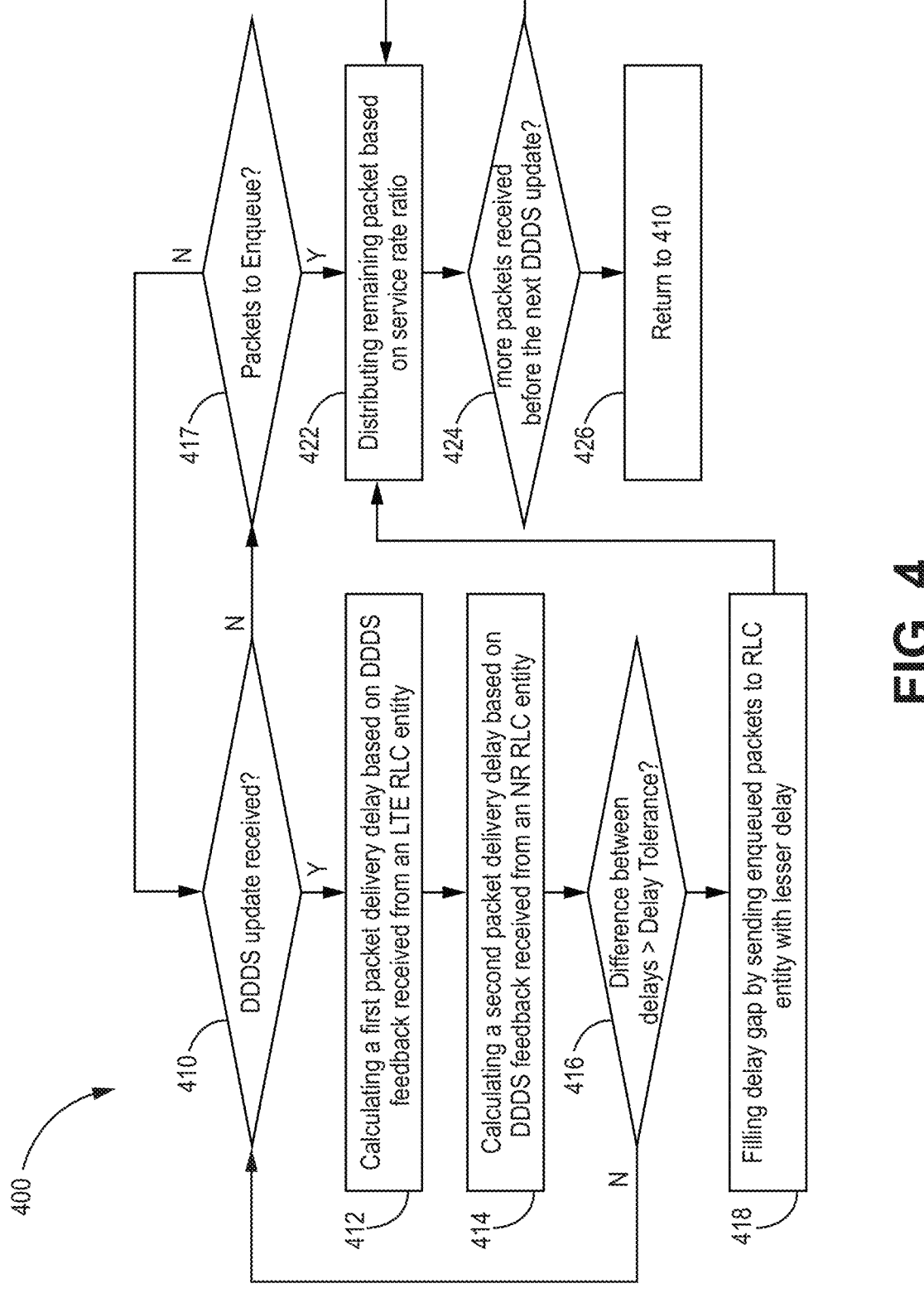
FIG. 4 is flow chart illustrating an alternate method for dual-connectivity traffic split management.

FIG. 4 is a flow chart diagram illustrating an alternate implementing an example method 400 for DC traffic split management that may be executed by the CU 102 to implement the traffic-split algorithm 252 coprocessor memory transaction regulation. It should be understood that the features and elements described herein with respect to the method of FIG. 4 may be used in conjunction with, in combination with, or substituted for elements of any of the other embodiments discussed herein and vice versa. Further, it should be understood that the functions, structures, and other description of elements for embodiments described in FIG. 4 may apply to like or similarly named or described elements across any of the figures and/or embodiments describe herein and vice versa.

Method 400 recognizes that it may not be necessary to calculate the LTE and NR path delays for every packet. Instead, the decision of where to enqueue can instead be made based on when DDDS updates are received. The method begin at 410 with determining when a DDDS update has been received. At the time, t, when the DDDS is received, the method 400 proceeds to 412 with calculating a first packet delivery delay based on DDDS feedback received from an LTE RLC entity, and to 414 with calculating a second packet delivery delay based on DDDS feedback received from an NR RLC entity. These are the same delay calculations performed at 310 and 320 in method 300, and the two delays graphically illustrated in FIG. 5 at 510.

Figure 5:
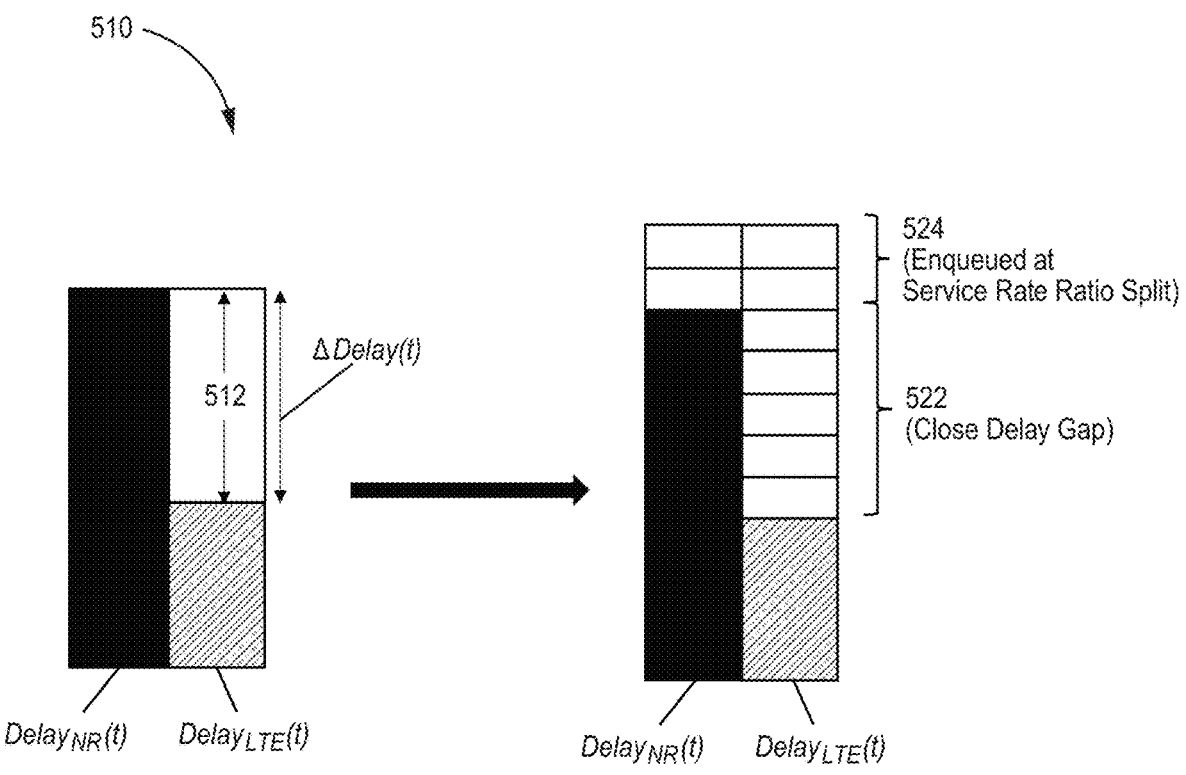
FIG. 5 is chart illustrating delay gap filling and service rate ratio packet distribution performed by the method of FIG. 4.

Method 400 next proceeds to 416 with determining a difference, $\Delta\,\text{Delay}(t)$, between DelayNR(t) and DelayLTE (t) and if that difference is greater than a delay tolerance. This difference between DelayNR(t) and DelayLTE(t) is shown in FIG. 5 for the circumstance where DelayNR(t) $>\text{DelayLTE}(t)$ so that $\Delta\text{Delay}=\text{Delay}_{NR}(t)-\text{Delay}_{LTE}(t)$ is a positive value. If the difference is not greater than a delay tolerance, then the method returns to 410 to await the next DDS update, assuming there are no further packets to enqueue (checked at 417). If the condition at 410 is false and there are packets to enqueue (checked at 417), then the method proceeds to 422.

If the difference at 416 is greater than a delay tolerance, then the method proceeds to 418 filling (closing) a delay gap (shown in FIG. 5 at 512) by sending enqueued packets to the RLC entity having a lesser delay. In this example, the difference in delay between DelayNR(t) and DelayLTE(t) indicates that DelayLTE(t) is the lesser delay so that the method 400 selects the LTE RLC 210 for enqueued packets until the delay gap 512 is filled as shown at 522 (that is, until the difference between DelayNR(t) and DelayLTE(t) has been reduced to zero (or other minimum acceptance criteria). The number of bytes of PDCP packets, K, to send on the LTE link to fill the delay gap may be computed from:

$$K = \min\left\{ PDCP\ SDU\ \text{Queue in Bytes}(t),\right.$$

$$\left.\text{floor}\left\{\Delta\,\text{Delay} \times \text{avg service rate of } LTE\left(\frac{\text{Bytes}}{\text{time}}\right)\right\}\right\}$$

Where K may be adjusted appropriately to so that an integer number of packets are placed on the LTE link, and the delay tolerance may be thought of as a parameter to reduce the computation load at the CU 102, at the slight expense of increased delay difference between the links. If the delay tolerance is set to zero, 416 is always "yes" if it is set to infinity, delay estimation at 416 is never performed always "no".

Once the delay gap is filled, the method 400 proceeds to 422 with distributing remaining packets based on a service rate ratio as shown at 524. For example, if packets to be enqueued are remaining, split every consecutive N1+N2 packets according to the service rate ratio N1:N2 over the NR and LTE links, where:

$$\frac{N1}{N2} \sim \frac{\text{avg service rate of } NR\ \left(\text{Bytes/sec}\right)\ (t)}{\text{avg service rate of } LTE\ \left(\text{Bytes/sec}\right)\ (t)}$$

N1+N2 is a minimal number of packets with which the above ratio can be achieved (exactly or approximately). For example, if the average service rates of NR and LTE are in the ratio 2:1, then for every 3 consecutive PDCP PDUs, 2 are placed on NR link, and 1 is placed on LTE link. Then, the method proceeds to 424 where if more packets are received before the next DDDS update, 422 is repeated. In 426, return to 410. When the next DDDS update is received (check again at 410) the method repeats from 410.

EXAMPLE EMBODIMENTS

Example 1 includes a dual-connectivity, split-bearer base station (base station), the base station comprising: at least one centralized unit (CU) comprising a centralized unit control-plane (CU-CP) and at least one centralized unit user-plane (CU-UP); at least one distributed unit (DU) coupled to the at least one CU-UP, wherein the at least one DU is coupled to one or more radio units (RUs) configured as a first cell group to establish a first radio link for communicating with user equipment (UE) within a wireless coverage area; an eNodeB coupled to the at least one CU-UP, wherein the eNodeB comprises one or more radio points (RPs) configured as a second cell group to establish a second radio link for communicating with user equipment (UE) within the wireless coverage area; and a traffic split controller configured to selectively direct Packet Data Convergence Protocol (PDCP) packets to either the DU or the eNodeB as a function of packet delay times associated with the DU and the eNodeB.

Example 2 includes the base station of Example 1, wherein the traffic split controller is configured to execute a traffic split algorithm, wherein the traffic split algorithm instructs the traffic split controller to: calculate a first packet delivery delay based on feedback received from a radio link control (RLC) entity of the eNodeB; calculate a second packet delivery delay based on feedback received from an RLC entity of the DU; and selectively enqueue PDCP packets to either an RLC Queue server of the eNodeB or an RLC Queue server of the DU based on whether the first or the second packet delivery delay is a lesser delay.

Example 3 includes the base station of Example 2, wherein the RLC entity of the eNodeB comprises a Long-Term-Evolution (LTE) RLC.

Example 4 includes the base station of any of Examples 2-3, wherein the RLC entity of the DU comprises a 5G New Radio (NR) RLC.

Example 5 includes the base station of any of Examples 2-4, wherein the feedback received from the RLC entity of the DU and the feedback received from the RLC entity of the eNodeB each comprise Downlink Data Delivery Status (DDDS) feedback derived from an indication of successful packet receptions by the UE.

Example 6 includes the base station of any of Examples 2-5, wherein the traffic split algorithm instructs the traffic split controller to calculate the first packet delivery delay and the second packet delivery delay in response to receiving Downlink Data Delivery Status (DDDS) updates.

Example 7 includes the base station of Example 6, wherein the traffic split algorithm instructs the traffic split controller to: determine a delay gap between the first packet delivery delay and the second packet delivery delay; and close the delay gap by sending enqueued packets to either the RLC Queue server of the eNodeB or the RLC Queue server of the DU based on whether the first or the second packet delivery delay has the lesser delay.

Example 8 includes the base station of Example 7, wherein the traffic split algorithm instructs the traffic split controller to: determine when the delay gap is filled; and distribute any remaining packets received prior to a next DDDS update based on a service rate ratio associated with the RLC Queue server of the eNodeB and the RLC Queue server of the DU.

Example 9 includes the base station of any of Examples 1-8, wherein the CU-UP is coupled to the DU over an F1-U interface.

Example 10 includes the base station of any of Examples 1-9, wherein CU-UP is coupled to the eNodeB over an X2 interface.

Example 11 includes the base station of any of Examples 1-10, wherein the DU is coupled to the one or more RUs by a fronthaul network.

Example 12 includes the base station of any of Examples 1-11, wherein the eNodeB is coupled to the one or more RPs by a fronthaul network.

Example 13 includes the base station of any of Examples 1-12, wherein the CU is coupled to a wireless service operator core network by an S1-U interface.

Example 14 includes a method for dual-connectivity, split-bearer traffic management for a base station, wherein the base station comprises: at least one centralized unit (CU) comprising a centralized unit control-plane (CU-CP) and at least one centralized unit user-plane (CU-UP); at least one distributed unit (DU) coupled to the at least one CU-UP, wherein the at least one DU is coupled to one or more radio units (RUs) configured as a first cell group to establish a first radio link for communicating with user equipment (UE) within a wireless coverage area; and an eNodeB coupled to the at least one CU-UP, wherein the eNodeB comprises one or more radio points (RPs) configured as a second cell group to establish a second radio link for communicating with user equipment (UE) within the wireless coverage area, the method comprising: calculating a first packet delivery delay based on feedback received from a radio link control (RLC) entity of the eNodeB; calculating a second packet delivery delay based on feedback received from an RLC entity of the DU; and selectively enqueuing Packet Data Convergence Protocol PDCP packets to either an RLC Queue server of the eNodeB or an RLC Queue server of the DU based on whether the first or the second packet delivery delay is a lesser delay.

Example 15 includes the method of Example 14, wherein calculating the first packet delivery delay and the second packet delivery delay, and selectively enquiring PDCP packets is performed by a traffic split controller comprising an traffic split algorithm executed by the CU, wherein the traffic split controller is configured to selectively direct the PDCP packets to either the DU or the eNodeB as a function of packet delay times associated with the DU and the eNodeB.

Example 16 includes the method of Example 15, further comprising: receiving the feedback received from the RLC entity of the DU and the feedback received from the RLC entity of the eNodeB each as Downlink Data Delivery Status (DDDS) feedback derived from an indication of successful packet receptions by the UE.

Example 17 includes the method of Example 16, further comprising: calculating the first packet delivery delay and the second packet delivery delay in response to receiving Downlink Data Delivery Status (DDDS) updates.

Example 18 includes the method of Example 17, further comprising: determining a delay gap between the first packet delivery delay and the second packet delivery delay; and closing the delay gap by sending enqueued packets to either the RLC Queue server of the eNodeB or the RLC Queue server of the DU based on whether the first or the second packet delivery delay has the lesser delay.

Example 19 includes the method of Example 18, further comprising: determining when the delay gap is filled; and distributing remaining packets received prior to a next DDDS update based on a service rate ratio associated with the RLC Queue server of the eNodeB and the RLC Queue server of the DU.

Example 20 includes the method of any of Examples 14-19, wherein the CU-UP is coupled to the DU over an F1-U interface.

Example 21 includes the method of any of Examples 14-20, wherein CU-UP is coupled to the eNodeB over an X2 interface.

Example 22 includes the method of any of Examples 14-21, wherein the DU is coupled to the one or more RUs by a fronthaul network.

Example 23 includes the method of any of Examples 14-22, wherein the eNodeB is coupled to the one or more RPs by a fronthaul network.

Example 24 includes the method of any of Examples 14-23, wherein the CU is coupled to a wireless service operator core network by an S1-U interface.

Example 25 includes the method of any of Examples 14-24, wherein an RLC entity of the eNodeB comprises a Long-Term-Evolution (LTE) RLC.

Example 26 includes the method of any of Examples 14-25, wherein an RLC entity of the DU comprises a 5G New Radio (NR) RLC.

In various alternative embodiments, system and/or device elements, method steps, or example implementations described throughout this disclosure (such as any of the base stations, eNodeB, gNodeB, baseband controller, centralized unit (CU), centralized unit control-plane (CU-CP), centralized unit user-plane (CU-UP), distributed unit (DU), radio units, radio points, core network, traffic split controller, fronthaul network, or sub-parts thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, base station related terms such as base stations, eNodeB, gNodeB, baseband controller, centralized unit (CU), centralized unit control-plane (CU-CP), centralized unit user-plane (CU-UP), distributed unit (DU), radio units, radio points, core network, traffic split controller, fronthaul network, or sub-parts thereof, refer to non-generic elements as would recognized and understood by those of skill in the art of telecommunications and networks and are not used herein as nonce words or nonce terms for the purpose of invoking 35 U.S.C. sec. 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A dual-connectivity, split-bearer base station (base station), the base station comprising:

at least one centralized unit (CU) comprising a centralized unit control-plane (CU-CP) and at least one centralized unit user-plane (CU-UP);

at least one distributed unit (DU) coupled to the at least one CU-UP, wherein the at least one DU is coupled to one or more radio units (RUs) configured as a first cell group to establish a first radio link for communicating with user equipment (UE) within a wireless coverage area;

an eNodeB coupled to the at least one CU-UP, wherein the eNodeB comprises one or more radio points (RPs) configured as a second cell group to establish a second radio link for communicating with the user equipment within the wireless coverage area;

a traffic split controller configured to selectively direct Packet Data Convergence Protocol (PDCP) packets to either the DU or the eNodeB as a function of packet delay times associated with the DU and the eNodeB; and wherein the traffic split controller is configured to execute a traffic split algorithm, wherein the traffic split algorithm instructs the traffic split controller to:

calculate a first packet delivery delay based on feedback received from a radio link control (RLC) entity of the eNodeB;

calculate a second packet delivery delay based on the feedback received from an RLC entity of the DU; and selectively enqueue the PDCP packets to either an RLC Queue server of the eNodeB or an RLC Queue server of the DU based on whether the first or the second packet delivery delay is a lesser delay;

wherein calculating the first packet delivery delay and the second packet delivery delay, and selectively enquiring PDCP packets is performed by the traffic split controller comprising the traffic split algorithm executed by the CU, wherein the traffic split controller is configured to selectively direct the PDCP packets to either the DU or the eNodeB as the function of the packet delay times associated with the DU and the eNodeB.

2. The base station of claim 1, wherein the RLC entity of the eNodeB comprises a Long-Term-Evolution (LTE) RLC.

3. The base station of claim 1, wherein the RLC entity of the DU comprises a 5G New Radio (NR) RLC.

4. The base station of claim 1, wherein the feedback received from the RLC entity of the DU and the feedback received from the RLC entity of the eNodeB each comprise Downlink Data Delivery Status (DDDS) feedback derived from an indication of successful packet receptions by the UE.

5. The base station of claim 1, wherein the traffic split algorithm instructs the traffic split controller to calculate the first packet delivery delay and the second packet delivery delay in response to receiving Downlink Data Delivery Status (DDDS) updates.

6. The base station of claim 5, wherein the traffic split algorithm instructs the traffic split controller to:

determine a delay gap between the first packet delivery delay and the second packet delivery delay; and close the delay gap by sending enqueued packets to either the RLC Queue server of the eNodeB or the RLC Queue server of the DU based on whether the first or the second packet delivery delay has the lesser delay.

7. The base station of claim 6, wherein the traffic split algorithm instructs the traffic split controller to:

determine when the delay gap is filled; and distribute any remaining packets received prior to a next DDDS update based on a service rate ratio associated with the RLC Queue server of the eNodeB and the RLC Queue server of the DU.

8. The base station of claim 1, wherein the at least one CU-UP is coupled to the DU over an F1-U interface.

9. The base station of claim 1, wherein the at least one CU-UP is coupled to the eNodeB over an X2 interface.

10. The base station of claim 1, wherein the DU is coupled to the one or more RUs by a fronthaul network.

11. The base station of claim 1, wherein the eNodeB is coupled to the one or more RPs by a fronthaul network.

12. The base station of claim 1, wherein the CU is coupled to a wireless service operator core network by an S1-U interface.

13. A method for dual-connectivity, split-bearer traffic management for a base station, wherein the base station comprises: at least one centralized unit (CU) comprising a centralized unit control-plane (CU-CP) and at least one centralized unit user-plane (CU-UP); at least one distributed unit (DU) coupled to the at least one CU-UP, wherein the at least one DU is coupled to one or more radio units (RUs) configured as a first cell group to establish a first radio link for communicating with user equipment (UE) within a wireless coverage area; and an eNodeB coupled to the at least one CU-UP, wherein the eNodeB comprises one or more radio points (RPs) configured as a second cell group to establish a second radio link for communicating with the user equipment within the wireless coverage area, the method comprising:

calculating a first packet delivery delay based on feedback received from a radio link control (RLC) entity of the eNodeB;

calculating a second packet delivery delay based on feedback received from an RLC entity of the DU; and selectively enqueuing Packet Data Convergence Protocol (PDCP) packets to either an RLC Queue server of the eNodeB or an RLC Queue server of the DU based on whether the first or the second packet delivery delay is a lesser delay;

selectively enqueuing Packet Data Convergence Protocol (PDCP) packets to either an RLC Queue server of the eNodeB or an RLC Queue server of the DU based on whether the first or the second packet delivery delay is a lesser delay;

wherein calculating the first packet delivery delay and the second packet delivery delay, and selectively enquiring PDCP packets is performed by a traffic split controller comprising a traffic split algorithm executed by the CU, wherein the traffic split controller is configured to selectively direct the PDCP packets to either the DU or the eNodeB as a function of packet delay times associated with the DU and the eNodeB.

14. The method of claim 13, further comprising:

receiving the feedback received from the RLC entity of the DU and the feedback received from the RLC entity of the eNodeB each as Downlink Data Delivery Status (DDDS) feedback derived from an indication of successful packet receptions by the UE.

15. The method of claim 14, further comprising:

calculating the first packet delivery delay and the second packet delivery delay in response to receiving Downlink Data Delivery Status (DDDS) updates.

16. The method of claim 15, further comprising:

determining a delay gap between the first packet delivery delay and the second packet delivery delay; and closing the delay gap by sending enqueued packets to either the RLC Queue server of the eNodeB or the RLC Queue server of the DU based on whether the first or the second packet delivery delay has the lesser delay.

17. The method of claim 16, further comprising:

determining when the delay gap is filled; and distributing remaining packets received prior to a next DDDS update based on a service rate ratio associated with the RLC Queue server of the eNodeB and the RLC Queue server of the DU.

18. The method of claim 13, wherein the at least one CU-UP is coupled to the DU over an F1-U interface.

19. The method of claim 13, wherein the at least one CU-UP is coupled to the eNodeB over an X2 interface.

20. The method of claim 13, wherein the DU is coupled to the one or more RUs by a fronthaul network.

21. The method of claim 13, wherein the eNodeB is coupled to the one or more RPs by a fronthaul network.

22. The method of claim 13, wherein the CU is coupled to a wireless service operator core network by an S1-U interface.

23. The method of claim 13, wherein the RLC entity of the eNodeB comprises a Long-Term-Evolution (LTE) RLC.

24. The method of claim 13, wherein the RLC entity of the DU comprises a 5G New Radio (NR) RLC.

* * * * *